(12) United States Patent
Uenishi et al.

(10) Patent No.: US 9,222,547 B2
(45) Date of Patent: Dec. 29, 2015

(54) WORM WHEEL, REDUCER, AND MOTOR WITH THE REDUCER

(75) Inventors: Eiji Uenishi, Chiba (JP); Kazuyuki Yamamoto, Chiba (JP); Yasuhiro Yamagata, Chiba (JP); Kiyoto Itou, Chiba (JP)

(73) Assignee: Mabuchi Motor Co., Ltd., Matsudo, Chiba (JP)

( * ) Notice: Subject to any disclaimer, the term of this patent is extended or adjusted under 35 U.S.C. 154(b) by 422 days.

(21) Appl. No.: 13/634,468

(22) PCT Filed: Mar. 3, 2011

(86) PCT No.: PCT/JP2011/001265
§ 371 (c)(1),
(2), (4) Date: Sep. 12, 2012

(87) PCT Pub. No.: WO2011/114642
PCT Pub. Date: Sep. 22, 2011

(65) Prior Publication Data
US 2013/0000435 A1 Jan. 3, 2013

(30) Foreign Application Priority Data
Mar. 15, 2010 (JP) .................................. 2010-058113

(51) Int. Cl.
*F16H 55/17* (2006.01)
*F16H 1/16* (2006.01)
*H02K 7/116* (2006.01)

(52) U.S. Cl.
CPC ................ *F16H 1/16* (2013.01); *H02K 7/1166* (2013.01); *Y10T 74/1987* (2015.01); *Y10T 74/19828* (2015.01)

(58) Field of Classification Search
CPC ..... F16H 1/16; H02K 7/1166; Y10T 74/19828
USPC .......................................................... 74/425
See application file for complete search history.

(56) References Cited

U.S. PATENT DOCUMENTS

| 3,949,626 A | 4/1976 | Berlinger, Jr. et al. |
| 5,970,808 A | 10/1999 | Oosterhuis et al. |
| 6,591,707 B2 * | 7/2003 | Torii et al. ........................ 74/425 |

(Continued)

FOREIGN PATENT DOCUMENTS

| CN | 1670401 A | 9/2005 |
| DE | 10 2006 012 861 A1 | 9/2007 |

(Continued)

OTHER PUBLICATIONS

International Preliminary Report on Patentability, mailed Oct. 23, 2012 for PCT Application No. PCT/JP2011/001265, 15 pages.

(Continued)

*Primary Examiner* — David M Fenstermacher
(74) *Attorney, Agent, or Firm* — Schwabe Williamson & Wyatt

(57) ABSTRACT

A worm wheel (50) is structured integrally with an output shaft (52). The worm wheel (50) includes the output shaft (52), a circular flange (50a) with the output shaft (52) placed as the center, and teeth (50b) formed on the periphery of the flange (50a) and in mesh with a worm. The flange (50a) is provided with a first recessed flange portion (50c) opposite to the side of the output shaft (52), and the bottom (54) of the first recessed flange portion (50c) has a ring-shaped first planar portion (54a).

12 Claims, 18 Drawing Sheets

(56) References Cited

U.S. PATENT DOCUMENTS

| | | | |
|---|---|---|---|
| 8,171,597 B2 * | 5/2012 | Yagi | 15/250.3 |
| 2002/0011127 A1 * | 1/2002 | Torii et al. | 74/425 |
| 2003/0177854 A1 * | 9/2003 | Haussecker et al. | 74/425 |
| 2005/0115343 A1 * | 6/2005 | Sakamaki | 74/89.23 |
| 2005/0115350 A1 * | 6/2005 | Ohashi et al. | 74/425 |
| 2006/0096400 A1 * | 5/2006 | Shinmura et al. | 74/425 |
| 2009/0071279 A1 | 3/2009 | Huck | |
| 2014/0165760 A1 * | 6/2014 | Itou et al. | 74/425 |

FOREIGN PATENT DOCUMENTS

| | | |
|---|---|---|
| DE | 10 2007 044 351 A1 | 3/2009 |
| JP | 10-267112 | 10/1998 |
| JP | H11-125325 | 5/1999 |
| JP | 2000-161472 | 6/2000 |
| JP | 2001-346358 | 12/2001 |
| JP | 2002-156007 | 5/2002 |
| JP | 2002-517694 | 6/2002 |
| JP | 2008-215549 | 9/2008 |
| JP | 2009-127677 | 11/2009 |

OTHER PUBLICATIONS

International Search Report, mailed May 31, 2011 for PCT Application No. PCT/JP2011/001265, 8 pages.

Office Action issued by the Chinese Patent Office for CN201180014071.1, mailed Jul. 29, 2014 (with English translation attached).

Office Action, issued in Japanese Patent Application No. 2012-505480, mailed Nov. 19, 2013, 3 pages.

Office Action issued by the German Patent Office for DE 112011100929.1, mailed Jan. 23, 2015 (with English translation attached).

Office Action issued by the Chinese Patent Office for CN201180014071.1, mailed Apr. 3, 2015 (with English translation attached).

* cited by examiner (a)

(b)

(a)

(b)

(c)

(a)

(b)

WORM WHEEL, REDUCER, AND MOTOR WITH THE REDUCER

CROSS REFERENCE TO RELATED APPLICATIONS

The present application is a national phase entry under 35 U.S.C. §371 of International Application No. PCT/JP2011/001265, filed Mar. 3, 2011, entitled "Worm Wheel, Reduction Gear, And Motor With Reduction Gear", which designates the United States of America, and which claims priority to Japanese Patent Application No. 2010-058113, filed Mar. 15, 2010, entitled "Worm Wheel, Reduction Gear, And Motor With Reduction Gear," the entire contents and disclosures of which are hereby incorporated by reference in their entireties.

TECHNICAL FIELD

The present invention relates to a reducer for a system member which is opened and closed by the use of motive power and, for example, a reducer used in opening and closing an power window or a sunroof of a motor vehicle, and a worm wheel applicable to such a reducer.

BACKGROUND ART

As a mechanism conventionally known for driving a vehicle's power window, there is a motor equipped with a reducer that includes a worm and a worm wheel (see Patent Document 1). In such a reducer, a worm and a worm wheel are housed in a gear housing. The gear housing is expected not only to meet the requirement for lighter weight and smaller size, but also to ensure required strength and dimensional accuracy. For example, there is known a structure in which a rib or ribs is/are formed on the outer surface of a wheel enclosure housing a worm wheel in order to ensure the strength of the gear housing (see Patent Document 2).

RELATED ART DOCUMENTS

[Patent Document 1] United States Patent Application Publication No. US2009/0071279.
[Patent Document 2] Japanese Unexamined Patent Application Publication (Kokai) No. 2001-346358.

DISCLOSURE OF INVENTION

Problems to be Solved by the Invention

However, the above-mentioned gear housing, which has a rib formed on the outer surface of the wheel enclosure, is such that the thickness of the gear housing is correspondingly larger.

The present invention has been made in view of the foregoing circumstances, and a purpose thereof is to provide a technology capable of realizing both a higher strength and thinning of a reducer in a high degree.

Means for Solving the Problem

In order to resolve the foregoing problems, a worm wheel according to one embodiment of the present invention is structured integrally with an output shaft. The worm wheel includes: an output shaft; a circular flange with the output shaft placed as a center; and teeth formed on a periphery of the flange and in mesh with a worm. The flange has a first recessed portion opposite to a side of the output shaft, and a bottom of the first recessed portion has a ring-shaped first planar portion.

By employing this embodiment, even when the ribs are provided within the casing that houses the worm wheel, these ribs can enter in the first recessed portion. Thus, the combination of the casing as described above and the worm wheel can realize the thinning of the casing and further the thinning of the reducer.

The first recessed portion may have a reinforcement portion, on an inner periphery of the first recessed portion, so as to raise the rigidity of the teeth. As a result, the strength and rigidity of the teeth are raised, and there will be reduced deformation of the worm wheel as a whole. This in turn will improve the rotation accuracy of the reducer using a worm wheel such as above.

The reinforcement portion may have a plurality of ribs that are arranged symmetrically about a center of the first recessed portion. As a result, the forming accuracy of the teeth is improved.

The teeth are preferably formed in a manner such that a plurality of teeth are always in mesh with the worm. The plurality of the ribs may be arranged at such intervals that one or more of the ribs are always on an inner periphery side of the plurality of teeth in mesh with the worm. This will prevent partial deformation of the worm wheel on account of a large force that may work on the plurality of the teeth in mesh with the worm.

The reinforcement portion may have a plurality of thumb holes that are formed symmetrically about the center of the first recessed portion. As a result, the forming accuracy of the teeth is improved.

The flange may have a second recessed portion on a side of the output shaft. A bottom of the second recessed portion may have a ring-shaped second planar portion. The second recessed portion may have a reinforcement portion, on an inner periphery of the second recessed portion, so as to raise the rigidity of the teeth. As a result, the strength and rigidity of the teeth are further raised, and there will be reduced deformation of the worm wheel as a whole.

A reducer according to another embodiment of the present invention includes: a worm to which the revolution of a motor is communicated; a worm wheel configured to engage with the worm and communicate the revolution to an output shaft; and a casing configured to house the worm wheel. The casing has an opposing portion in opposition to a circular flange of the worm wheel, and there is provided a rib protruding inward from the opposing portion By employing this embodiment, the ribs are provided within the casing. Thus, compared with the case where the ribs are provided outward on the casing, it is possible not only to raise the strength of the casing of the reducer but also to make the casing thinner and furthermore the reducer thinner.

Still another embodiment of the present invention relates also to a reducer. The reducer includes: a worm to which the revolution of a motor is communicated; a worm wheel configured to engage with the worm and communicate the revolution to an output shaft; and a casing configured to house the worm wheel. The casing has an opposing portion in opposition to a circular flange of the worm wheel. The opposing portion has a recessed casing portion recessed toward the interior of the casing, and the recessed casing portion is provided with ribs.

By employing this embodiment, the ribs are provided in the recessed casing portion which is recessed toward the interior of the casing. Thus, compared with the case where the ribs are provided outward on the casing, it is possible not only to raise the strength of the casing of the reducer but also to make the casing thinner and furthermore the reducer thinner.

A bottom of the recessed casing may be such that a surface on an output shaft side of the bottom constitutes a sliding surface over which the flange slides. The opposing portion may be such that a surface thereof opposite to the worm wheel constitutes a sliding surface over which worm wheel slides.

The worm wheel may have teeth formed on a periphery thereof. A recessed flange portion which is recessed toward the output shaft from an end surface in opposition to the opposing portion of the teeth may be provided in a middle part of the flange, and at least part of the ribs may be located in the recessed flange portion. As a result, the ribs can enter into the recessed flange portion without causing interference with the flange, so that the opposing portion of the casing can be brought closer to the worm wheel.

The worm wheel may be structured integrally with the output shaft. This enables eliminating the use of a shock-absorbing member which must sometimes be inserted between the worm wheel and the output shaft when they are separate bodies, thus helping to reduce the number of component parts required.

The output shaft may be rotatably supported by a fixed shaft fixed to the casing.

Still another embodiment of the present invention relates to a motor with a reducer. The reducer-equipped motor includes: a motor; and a reducer coupled to a shaft of the motor. The motor includes a housing having two pairs opposing flat surfaces.

By employing this embodiment, the motor with a reducer is made thinner in contrast to a motor equipped with a cylindrical housing. Also, when, for example, a wire harness enabling the power feeding to the motor is secured to the housing, the work efficiency is improved because the wire harness is secured on the flat surface.

At least one of the two pairs of opposing flat surfaces may be parallel to the opposing portion of the casing. This realizes further thinning of the reducer-equipped motor.

Optional combinations of the aforementioned constituting elements, and implementations of the invention in the form of methods, apparatuses, systems, and so forth may also be practiced as additional modes of the present invention.

Advantageous Effects

The present invention realizes both a higher strength and thinning of a reducer in a higher level.

BEST MODE FOR CARRYING OUT THE INVENTION

Figure 1:
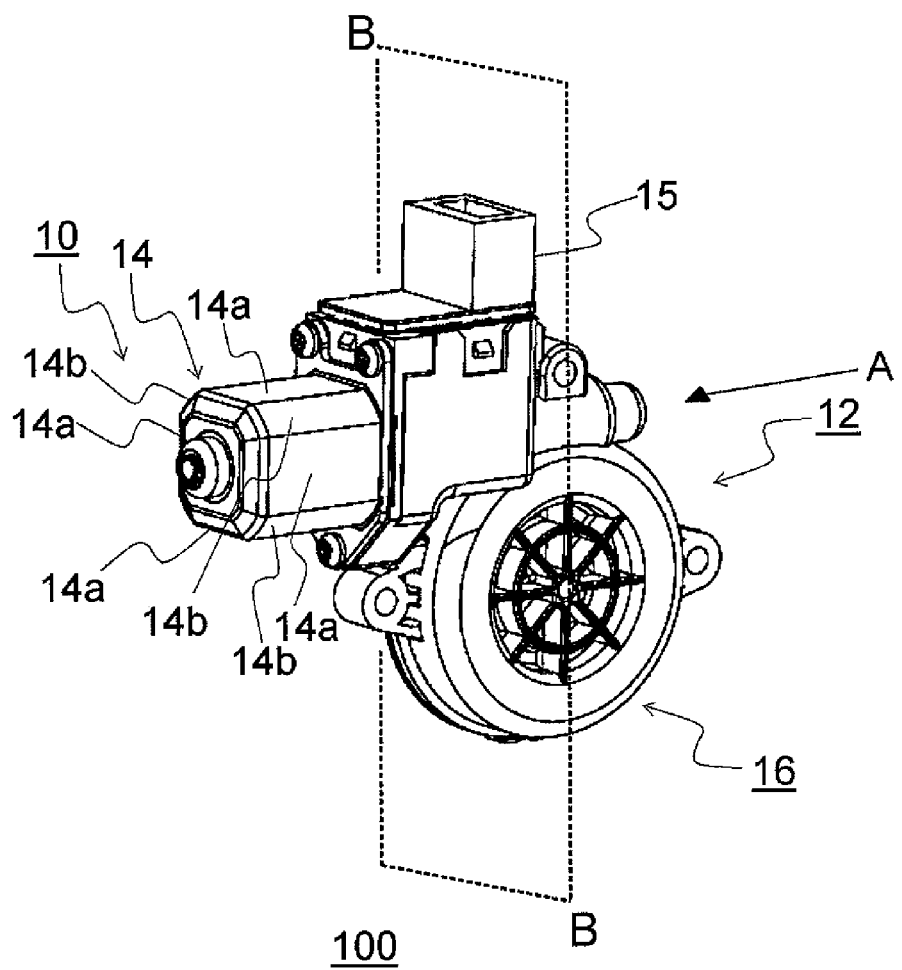
FIG. 1 is a perspective view of a DC motor with a reducer according to the present embodiment.

A reducer according to the present invention is applicable to a system capable of moving an object by reducing the speed of the motion of a motor, and it is, for instance, well-suited to such systems as power window, sunroof, powered seat, and door closure of a motor vehicle.

Hereinafter, the present invention will be described based on preferred embodiments with reference to the accompanying drawings. The same or equivalent constituents or members illustrated in each drawing will be denoted with the same reference numerals, and the repeated description thereof will be omitted as appropriate. Moreover, the embodiments given hereinbelow are for illustrative purposes only and does not limit the scope of the present invention.

(First Embodiment)

FIG. 1 is a perspective view of a DC motor 100 with a reducer according to the present embodiment. The DC motor 100 with a reducer includes a motor unit 10 and a reducer 12 which is coupled to a shaft of the motor unit 10. The motor unit 10 is provided with a tubular housing 14 and a connector 15 for feeding power from outside. The housing 14 has two pairs of opposing flat surfaces 14a and a plurality of connecting surfaces 14b connecting the flat surfaces 14a on the sides. It is to be noted that the housing 14 may be a square-shaped housing comprised of two pairs of flat surfaces without the connecting surfaces. The reducer 12 is provided with a cylindrical casing 16 for housing a worm wheel to be discussed later.

Figure 2:
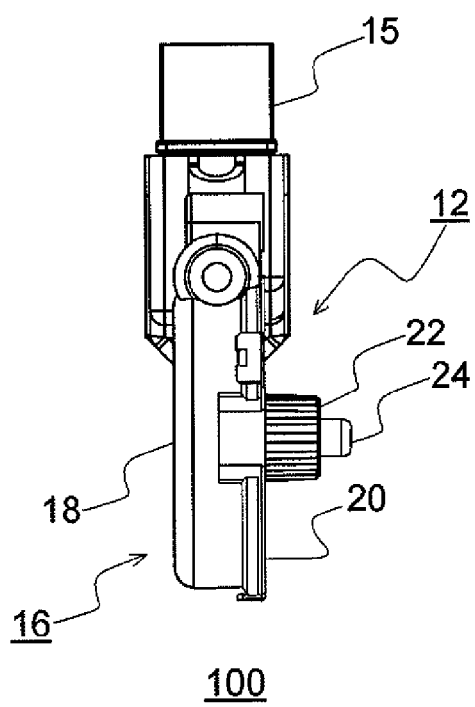
FIG. 2 is a side view of a DC motor with a reducer of FIG. 1 seen in the A direction.
Figure 3:
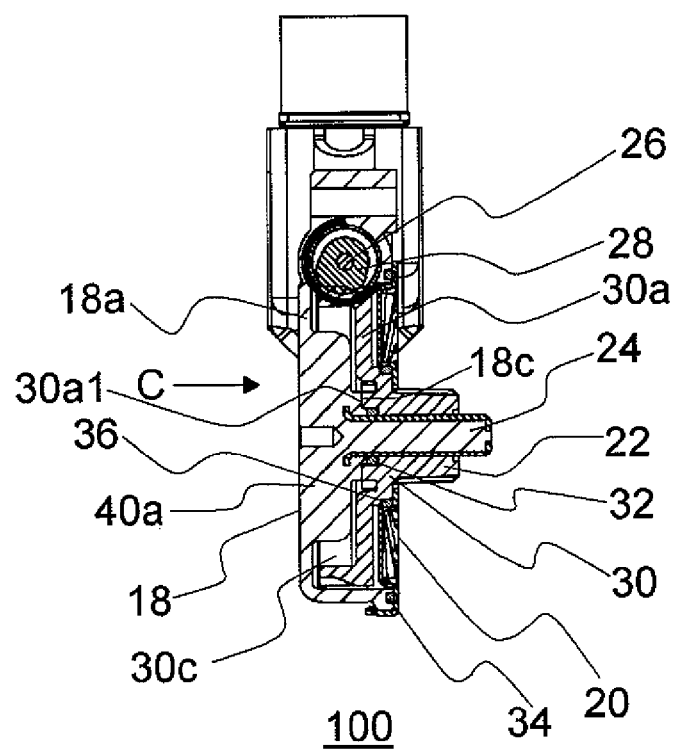
FIG. 3 is a cross-sectional view of a DC motor with a reducer taken along line B-B of FIG. 1.

FIG. 2 is a side view of the DC motor 100 with reducer of FIG. 1 seen in the A direction. FIG. 3 is a cross-sectional view of the DC motor 100 with a reducer taken along line B-B of FIG. 1.

As shown in FIG. 2, the casing 16 includes a gear case body 18 and a cover 20. The cover 20 has a circular opening formed in the center thereof, and projecting outward from the opening are an output shaft 22 and a fixed shaft 24 which rotatably supports the output shaft 22. As shown in FIG. 3, the fixed shaft 24 is fixed to the gear case body 18.

The gear case body 18 houses a worm 28, which is fixed to a shaft 26 of the motor unit 10, and a worm wheel 30. The revolution of the motor unit 10 is communicated to the worm 28 via the shaft 26. The worm wheel 30, which is so structured as to engage with the worm 28, communicates the revolution to the output shaft 22. The worm wheel 30 is rotatably supported by the fixed shaft 24 which is fixed to the gear case body 18.

An O-ring 32 is held between the fixed shaft 24 and the worm wheel 30, thereby preventing the entry of foreign matter or moisture into a gear area. Also, the cover 20 is fitted on the gear case body 18 with an O-ring 34 and an O-ring 36 held between the cover 20 and the gear case body 18. The gear case body 18 has an opposing portion 18a in opposition to a circular flange 30a of the worm wheel 30.

Figure 4:
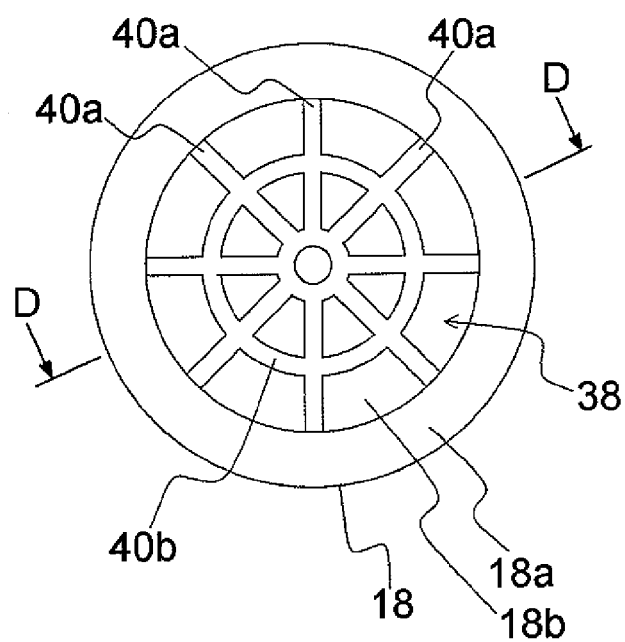
FIG. 4 is a bottom view of a gear case body as a reducer shown in FIG. 3 is seen in the C direction.
Figure 5:
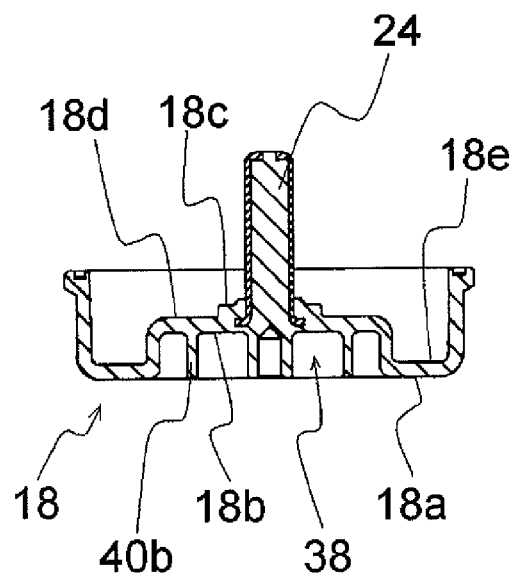
FIG. 5 is a cross-sectional view of a gear case body shown in FIG. 4 as it is seen in the D direction.

FIG. 4 is a bottom view of the gear case body as the reducer shown in FIG. 3 is seen in the C direction. FIG. 5 is a cross-sectional view of the gear case body shown in FIG. 4 as it is seen in the D direction. As shown in FIG. 4 and FIG. 5, the gear case body 18 has a recessed casing portion 38, in a central part of the circular opposing portion 18a, recessed toward the interior of the casing. The recessed casing portion 38 is provided with a plurality of radially-arranged ribs 40a and a loop of a rib 40b. The strength of the casing 16 is raised by these ribs 40a and 40b. In this manner, the recessed casing portion 38 recessed toward the interior of the casing is formed in the opposing portion 18a which is the bottom of the gear case body 18, and the ribs are provided in the recessed casing portion 38. Hence, compared with the case where the ribs are provided outward on the casing, it is possible not only to raise the strength of the casing 16 of the reducer 12 but also to make the casing 16 thinner and furthermore the reducer 12 thinner.

Figure 6:
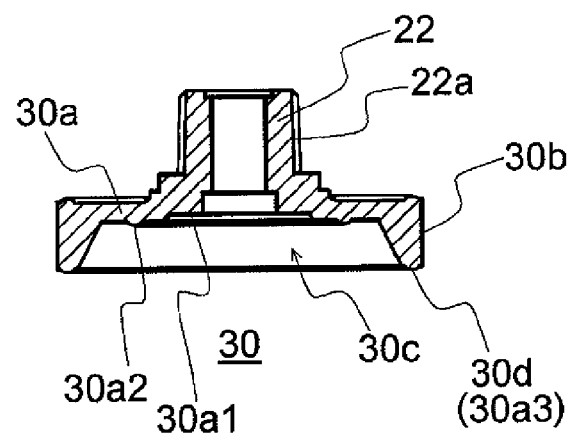
FIG. 6 is a cross-sectional view of a worm wheel according to a first embodiment.
Figure 7:
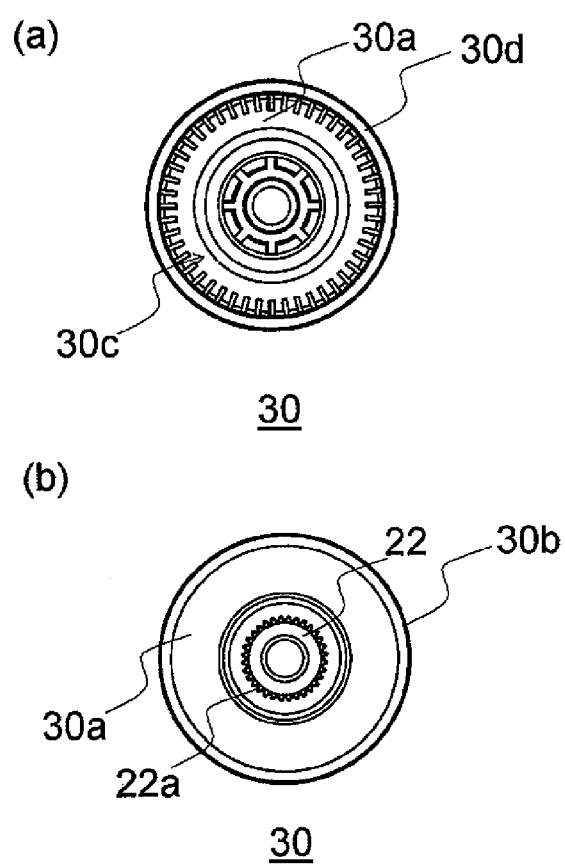
FIG. 7A is a bottom view of a worm wheel according to a first embodiment.
FIG. 7B is a top view of a worm wheel according to a first embodiment.

Next, the worm wheel 30 will be described in detail. FIG. 6 is a cross-sectional view of the worm wheel 30 according to the first embodiment. FIG. 7A is a bottom view of the worm wheel 30 according to the first embodiment, and FIG. 7B is a top view of the worm wheel 30 according to the first embodiment.

As shown in each of FIG. 6 and FIGS. 7A and 7B, the worm wheel 30 has a cylindrical shape and is provided with an output shaft 22, which is a smaller-diameter portion, at an end thereof. Formed on the periphery of the output shaft 22 are teeth 22a which are in mesh with a rotating member (e.g., cable drum) connected to an apparatus to be driven. Also, formed on the periphery of a larger-diameter portion of the worm wheel 30 are teeth 30b which are in mesh with the worm 28. In each of the Figures, the shape of the teeth 30b is not illustrated, but the shape is not subject to any particular limitation so long as the worm wheel 30 can rotate in mesh with the worm 28. For example, the shape thereof may be in the shape of a helical gear.

Provided in a middle part of the flange 30a is a recessed flange portion 30c. The recessed flange portion 30c, as shown in FIG. 3, is recessed toward the output shaft from an end surface 30d of the teeth 30b. Note here that the end surface 30d is a loop-shaped portion in opposition to the opposing portion 18a of the gear case body 18. Also, as shown in FIG. 3, part of the ribs 40a is located in the recessed flange portion 30c. As a result, the ribs 40a can enter into the recessed flange portion 30c without causing interference with the flange 30a, so that the opposing portion 18a of the gear case body 18 can be brought closer to the worm wheel 30, thus making the whole casing 16 thinner.

It is to be noted that a bottom 18b of the recessed casing portion 38 according to the present embodiment is such that the surface on the output shaft side of the bottom 18b constitutes a first sliding surface 18c which slides over a first sliding portion 30a1 of the flange 30a. The first sliding portion 30a1 is formed in a bottom portion of the recessed flange portion 30c.

It is to be appreciated that the sliding portion of the worm wheel 30 sliding in relation to the gear case body 18 is not limited thereto, but various forms of sliding portion are conceivable. For example, the worm wheel 30 may have a second sliding portion 30a2 (see FIG. 6) which slides over a second sliding surface 18d of the recessed casing portion 38 shown in FIG. 5. The second sliding surface 18d of the recessed casing portion 38 is formed radially outside of the first sliding surface 18c. Also, the second sliding portion 30a2 of the worm wheel 30 is formed at the bottom of the recessed flange portion 30c and in a region radially outside of the first sliding portion 30a1. Further, the worm wheel 30 may have a third sliding portion 30a3 (see FIG. 6) which slides over a third sliding surface 18e on the worm wheel side of the opposing portion 18a shown in FIG. 5. In the present embodiment, the third sliding portion 30a corresponds to the end surface 30d.

The sliding portion of the worm wheel 30 sliding over the gear case body 18 is not limited to a single sliding portion. There may be a plurality of sliding portions, which are to be selected as appropriate in consideration of vibration, noise, durability, and the like. For example, the worm wheel 30 may slide in relation to the gear case body 18, using the first sliding portion 30a1 and second sliding portion 30a2 thereof. Or the worm wheel 30 may slide in relation to the gear case body 18, using the first sliding portion 30a1 or the second sliding portion 30a2, and the third sliding portion 30a3 thereof.

It is to be noted that the worm wheel 30 according to the present embodiment is structured integrally with the output shaft 22. This enables eliminating the use of a shock-absorbing member which must sometimes be inserted between the worm wheel and the output shaft when they are separate bodies, thus helping to reduce the number of component parts required.

Also, the DC motor 100 with a reducer according to the present embodiment, which has the motor unit 10 provided with a housing 14 having two pairs of opposing flat surfaces, is made thinner in contrast to a motor equipped with a cylindrical housing. Note that at least one of the two pairs of opposing flat surfaces 14a is in parallel with the opposing portion 18a of the gear case body 18. This realizes further thinning of the DC motor 100 with a reducer. Also, since the housing 14 of the motor unit 10 has four flat surfaces 14a, there are wider selections of layout when other parts (e.g., an electronic control unit (ECU) or a ferrite core for prevention of electric noise) are to be secured on or brought close to the flat surfaces, thus making it possible to use space efficiently.

Figure 8:
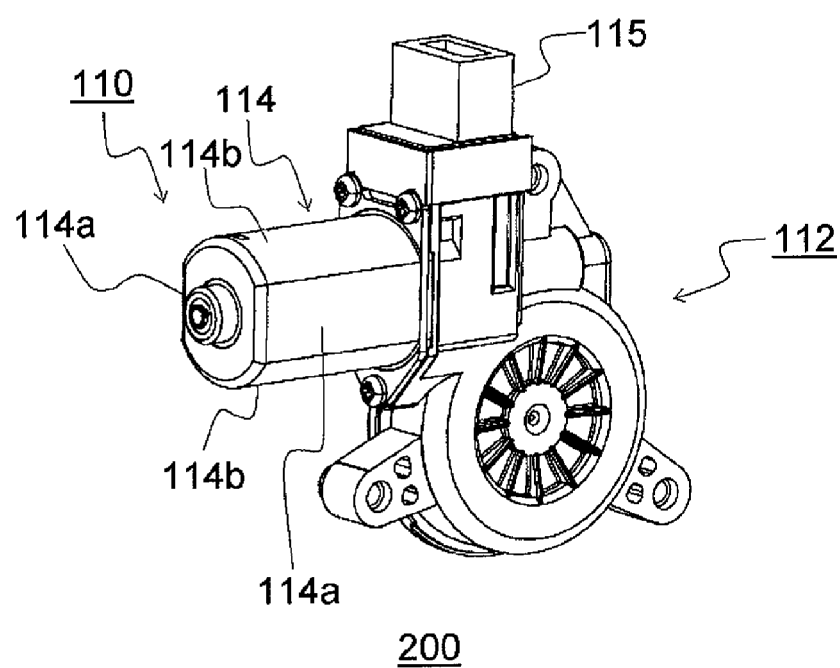
FIG. 8 is a perspective view of a DC motor with a reducer according to a modification of the present embodiment.

It should be appreciated that the shape of the housing of the motor unit is not necessarily limited to the approximately quadrangular shape of the housing 14. FIG. 8 is a perspective view of a DC motor 200 with a reducer according to a modification of the present embodiment. The DC motor 200 with a reducer includes a motor unit 110 and a reduce 112 which is coupled to a shaft of the motor unit 110. The motor unit 110 is provided with a tubular housing 114 and a connector 115 for feeding power from outside. The housing 114 has one pair of opposing flat surfaces 114a and one pair of connecting curved surfaces 114b connecting the flat surfaces 114a on the sides. The housing 114 being shaped like this will help reduce the thickness of the motor unit 110 and make the DC motor 200 with a reducer as a whole thinner.

Figure 9:
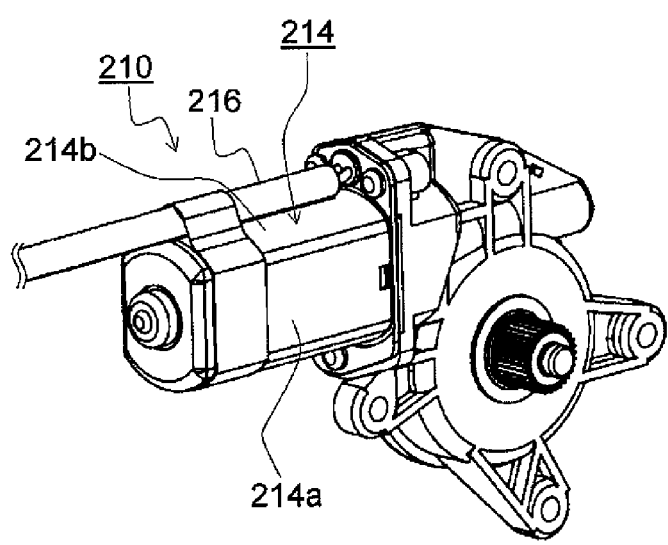
FIG. 9 is a perspective view of a reducer-equipped DC motor with a wire harness secured to the motor unit thereof having a housing shape as shown in FIG. 8.

There are cases where the reducer-equipped DC motor as described above has a wire harness enabling power feeding from outside secured to the motor unit thereof. FIG. 9 is a perspective view of a reducer-equipped DC motor with a wire harness secured to the motor unit thereof having a housing shape as shown in FIG. 8. As shown in FIG. 9, a DC motor 300 with a reducer has a wire harness 216 secured to a connecting curved surface 214b of the housing 214 of a motor unit 210 thereof. This arrangement is chosen because the wire harness secured on a flat surface 214a of the housing 214 will increase the thickness of the DC motor 200 with a reducer in the output shaft direction. On the other hand, however, the wire harness secured on the connecting curved surface 214b has a problem of unsteady installation, and therefore there is room for improvement from the viewpoint of work efficiency.

In contrast to this, the previously described reducer-equipped DC motor 100, of which all the four surfaces of the housing 14 of the motor unit 10 are flat, features an improved work efficiency when a wire harness is secured on a flat surface of the housing 14.

(Second Embodiment)

The worm wheel according to each of the following embodiments can be combined with the above-described casing instead of the worm wheel according to the first embodiment. In doing so, the structure of the casing may be changed as appropriate in accordance with the structure of the worm wheel to be housed therein.

Figure 10:
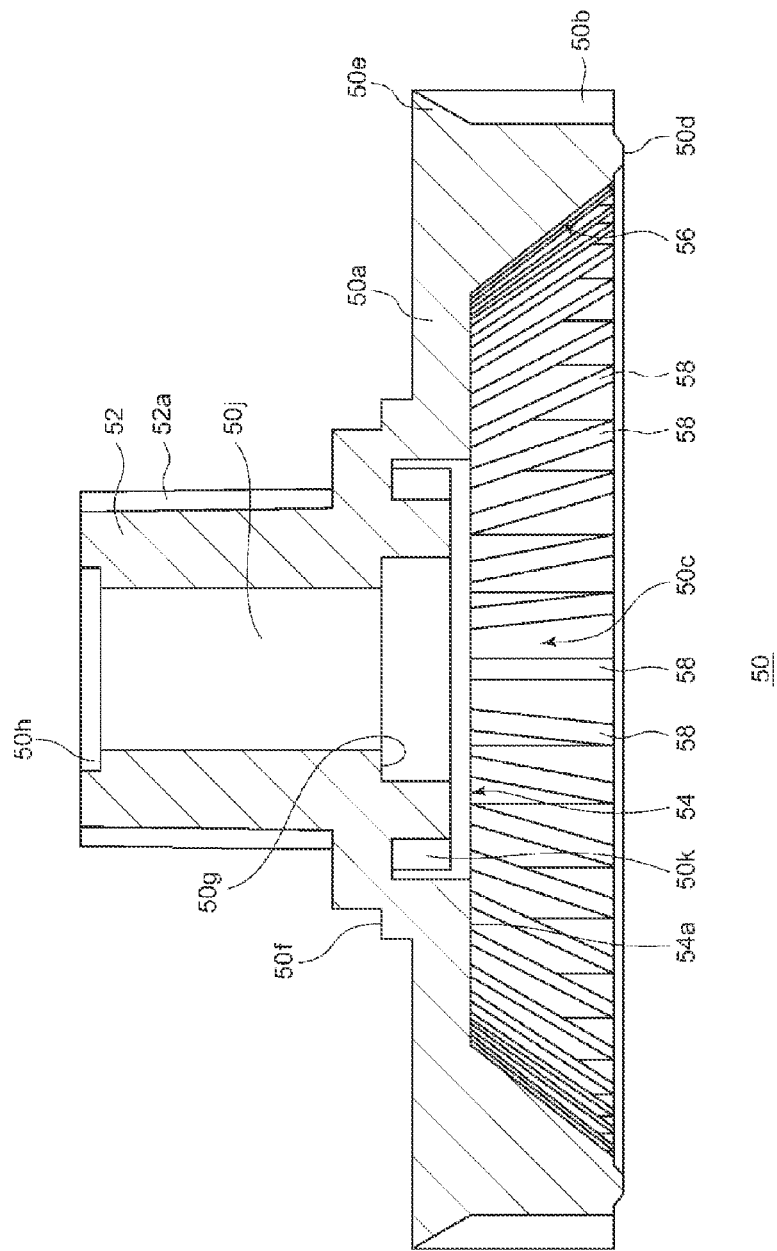
FIG. 10 is a cross-sectional view of a worm wheel according to a second embodiment.
Figure 11:
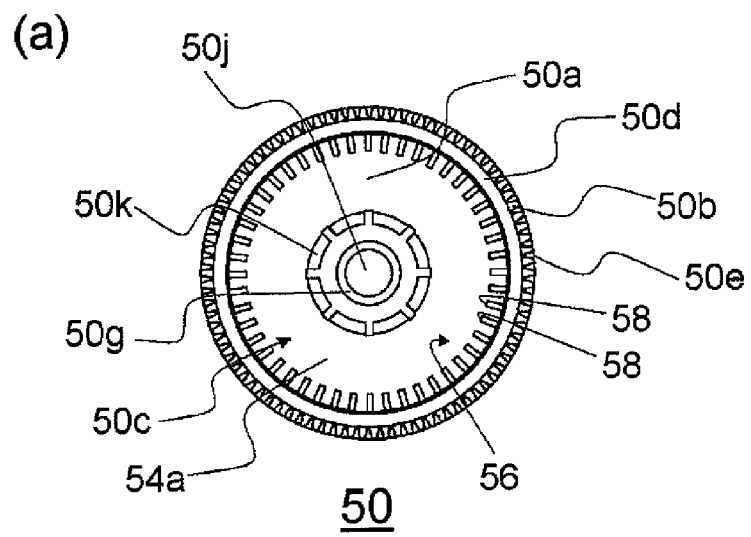
FIG. 11A is a bottom view of a worm wheel according to a second embodiment.
FIG. 11B is a top view of a worm wheel according to a second embodiment.
Figure 11:
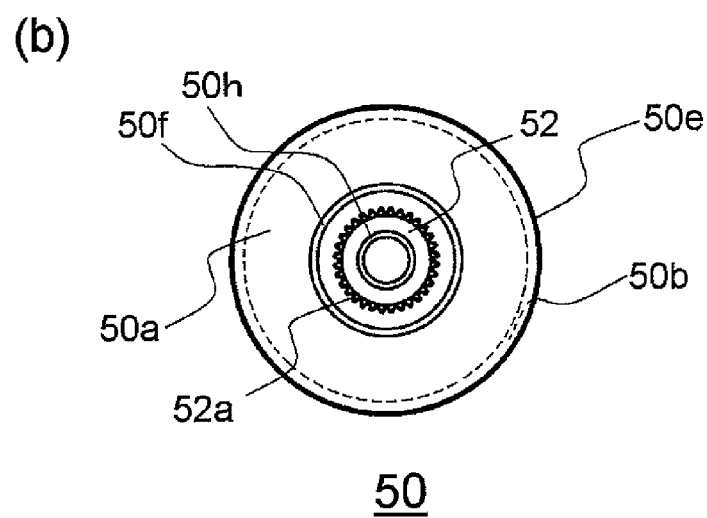

FIG. 10 is a cross-sectional view of a worm wheel according to a second embodiment. FIG. 11A is a bottom view of the worm wheel according to the second embodiment, and FIG. 11B is a top view of the worm wheel according to the second embodiment. Note that as for the worm wheel according to each of the following embodiments, the identical components are given the identical reference numerals, and the repeated description thereof will be omitted as appropriate.

As shown in FIG. 10 and FIGS. 11A and 11B, a worm wheel 50 has a cylindrical shape and is structured integrally with an output shaft 52. The worm wheel 50 includes an output shaft 52, a circular flange 50a surrounding the output shaft 52, and teeth 50b formed on the periphery of the flange 50a and in mesh with a worm. The flange 50a is provided with a first recessed flange portion 50c in the middle of the side thereof opposite to the side of the output shaft 52 (downside in FIG. 10). A bottom 54 of the first recessed flange portion 50c has a ring-shaped first planar portion 54a.

Formed on the periphery of the output shaft 52 are teeth 52a which are in mesh with a rotating member (e.g., cable drum) connected to an apparatus to be driven. On the worm wheel according to the previously described first embodiment and the following embodiments up to a fifth embodiment, the shape of the teeth formed on the periphery of the flange is not subject to any particular limitation so long as the worm wheel can rotate in mesh with the worm. For example, the shape thereof may be in the shape of a helical gear.

Figure 12:
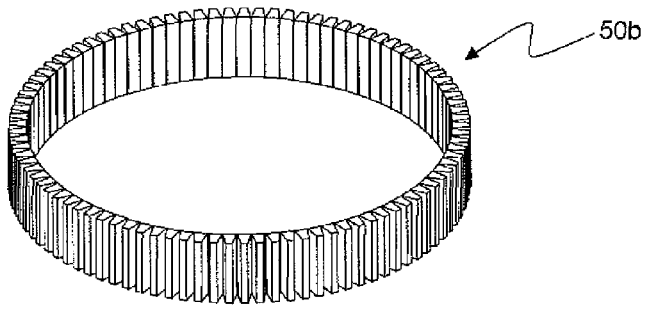
FIG. 12A is a perspective view showing an example of teeth according to the present embodiment.
FIG. 12B is a top view showing an example of teeth according to the present embodiment.
FIG. 12C is a side view showing an example of teeth according to the present embodiment.
Figure 12:
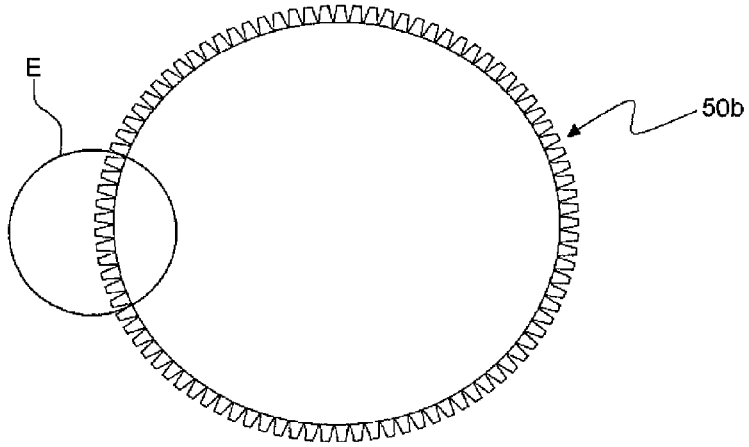
Figure 12:

FIG. 12A is a perspective view showing an example of teeth 50b according to the present embodiment, FIG. 12B is a top view showing an example of teeth 50b according to the present embodiment, and FIG. 12C is a side view showing an example of teeth 50b according to the present embodiment. It is to be noted that although FIGS. 12A to 12C show a spur gear whose tooth spaces are parallel to the axis of rotation for simplicity of illustration, a helical gear having the tooth spaces at a slant with respect to the axis of rotation is preferable for a normal worm wheel. It should be noted also that a teeth joining portion 50e (see FIGS. 11A and 11B and FIGS. 12A to 12C) is formed at the top ends of the teeth 50b. This improves the strength and rigidity of the teeth 50b.

The first recessed flange portion 50c, as shown in FIG. 10, is recessed toward the output shaft from an end surface 50d near the teeth 50b. Note here that the end surface 50d is, for instance, a loop-shaped portion in opposition to the opposing portion 18a of the gear case body 18 shown in FIG. 5. The end surface 50d functions as a sliding portion sliding along the gear case body 18.

With the worm wheel 50 according to the present embodiment, part of the ribs 40a as shown in FIG. 3 can be located in the first recessed flange portion 50c. As a result, the ribs 40a can enter into the first recessed flange portion 50c without causing interference with the flange 50a, so that the opposing portion 18a of the gear case body 18 can be brought closer to the worm wheel 50, thus making the whole casing thinner.

In other words, the worm wheel 50 according to the present embodiment allows entry of the ribs 40a as shown in FIG. 3, even when the ribs 40a are provided, in the first recessed flange portion 50c, within the casing that houses the worm wheel 50. Thus, the combination of the casing as described above and the worm wheel 50 can realize the thinning of the casing and further the thinning of the reducer.

Also, the first recessed flange portion 50c is provided, on an inner periphery 56 thereof, with a plurality of ribs 58 which serve as reinforcement portions to raise the rigidity of the teeth 50b. The ribs 58 are each triangular in shape. As a result, the strength and rigidity of the teeth 50b are raised, and there will be reduced deformation of the worm wheel as a whole. This in turn will improve the rotation accuracy of the reducer using a worm wheel such as above.

Also, as shown in FIG. 11A, the plurality of ribs 58 are arranged symmetrically about the center of the first recessed flange portion 50c. As a result, the forming accuracy of the teeth 50b is improved.

Figure 13:
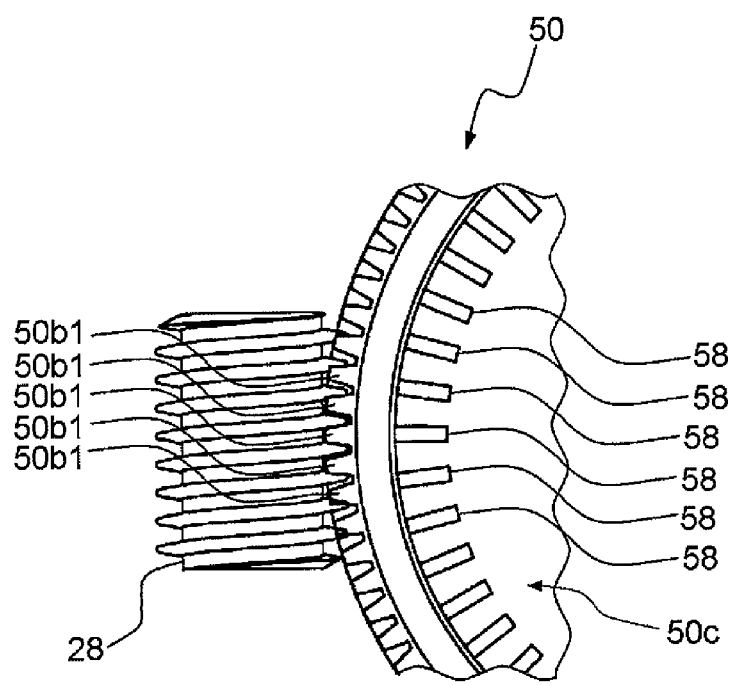
FIG. 13 is an enlarged view of a region E shown in FIG. 12B.

Also, the teeth 50b of the worm wheel 50 according to the present embodiment are so formed that a plurality of teeth are always in mesh with the worm. FIG. 13 is an enlarged view of a region E shown in FIG. 12B. As shown in FIG. 13, the plurality of the ribs 58 are arranged at such intervals that one or more of them are always on the inner periphery side of a plurality (e.g., 4 or 5) of teeth 50b1 in mesh with the worm 28. This will prevent partial deformation of the worm wheel 50 on account of a large force that may work on the plurality of the teeth 50b1 in mesh with the worm 28.

Note also that the worm wheel 50 is formed with loop-shaped positioning portions 50f, 50g, and 50h that can position a sealing member such as an O-ring. This prevents entry of water or dust into the apparatus from the sliding portions or joints with the other parts.

Also, the worm wheel 50 is structured such that a hole 50j into which the fixed shaft 24 is inserted is near the center of the bottom 54 but does not reach the end surface 50d. That is, the hole 50j is formed, but reaches only as far as the neighborhood of the bottom 54 of the first recessed flange portion 50c. Also, formed at equal intervals around the hole 50i are recessed portions 50k which are deeper than the first recessed flange portion 50c. Thus, the worm wheel 50 has the first recessed flange portion 50c and the recessed portions 50k formed thereon, so that the volume thereof to be occupied by resin can be reduced, thereby contributing to lighter weight and reduced material cost.

Also, the worm wheel 50 has the first recessed flange portion 50c formed only on one side of the flange 50a (on the side opposite to the output shaft), so that the first recessed flange portion 50c can be made deeper. As a result, the ribs 40a and 40b of the gear case body 18, which enter into the first recessed flange portion 50c, can be higher (deeper), thereby raising the strength of the gear case body 18.

(Third Embodiment)

Figure 14:
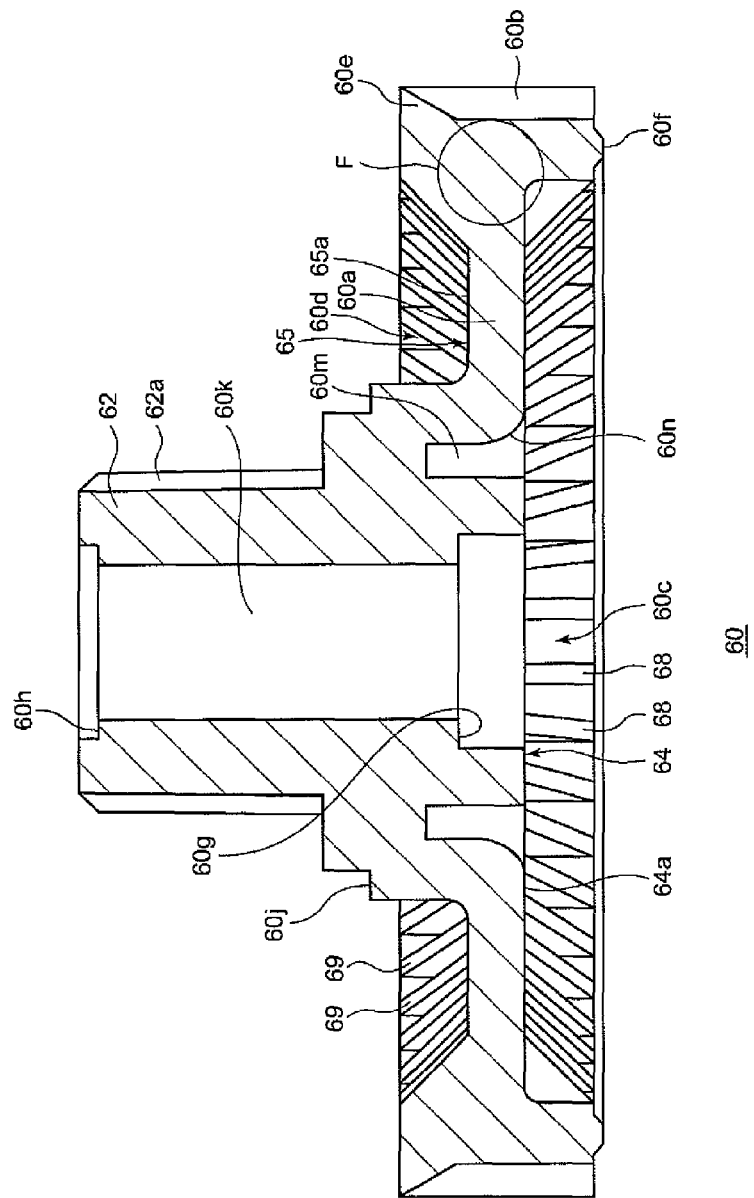
FIG. 14 is a cross-sectional view of a worm. wheel according to a third embodiment.
Figure 15:
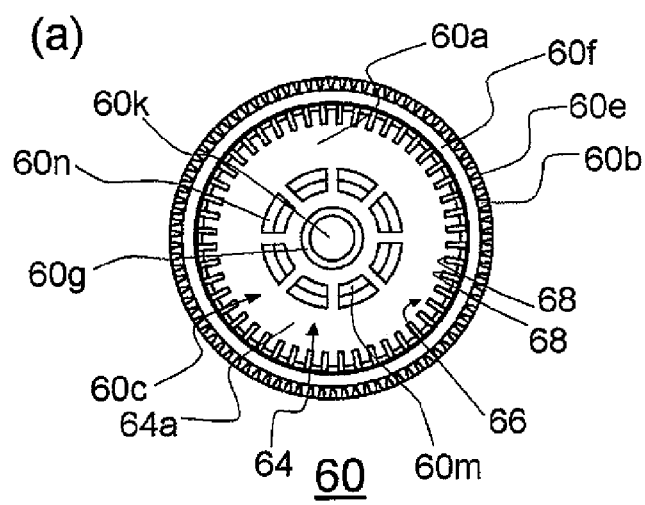
FIG. 15A is a bottom view of a worm wheel according to a third embodiment.
FIG. 15B is a top view of a worm wheel according to a third embodiment.
Figure 15:
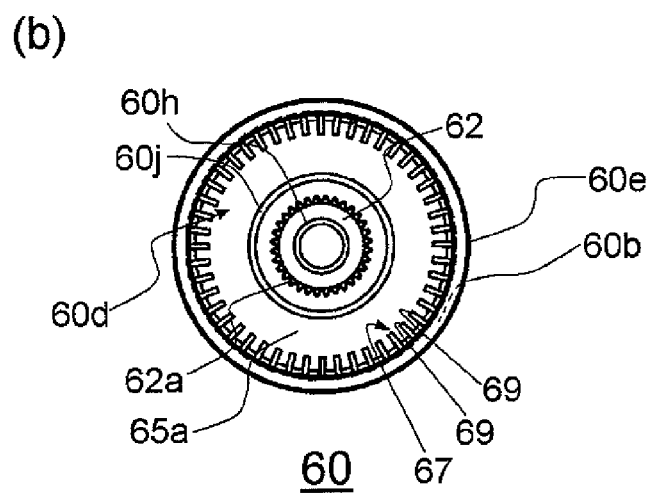

FIG. 14 is a cross-sectional view of a worm wheel according to a third embodiment. FIG. 15A is a bottom view of the worm wheel according to the third embodiment. FIG. 15B is a top view of the worm wheel according to the third embodiment.

As shown in FIG. 14, a worm wheel 60 is structured integrally with an output shaft 62. The worm wheel 60 includes an output shaft 62, a circular flange 60a surrounding the output shaft 62, and teeth 60b formed on the periphery of the flange 60a and in mesh with a worm.

As shown in FIG. 14 and FIG. 15A, the flange 60a is provided with a first recessed flange portion 60c in the middle of the side thereof opposite to the side of the output shaft 62 (downside in FIG. 14). A bottom 64 of the first recessed flange portion 60c has a ring-shaped first planar portion 64a.

Also, as shown in FIG. 14 and FIG. 15B, the flange 60a is provided with a second recessed flange portion 60d on the side of the output shaft 62. A bottom 65 of the second recessed flange portion 60d has a ring-shaped second planar portion 65a.

Formed on the periphery of the output shaft 62 are teeth 62a which are in mesh with a rotating member connected to an apparatus to be driven. It should be noted also that a teeth joining portion 60e is formed at the top ends of the teeth 60b. This improves the strength and rigidity of the teeth 60b.

The first recessed flange portion 60c, as shown in FIG. 14, is recessed toward the output shaft from an end surface 50f of the teeth 60b. Note here that the end surface 60f is, for instance, a loop-shaped portion in opposition to the opposing portion 18a of the gear case body 18 shown in FIG. 5. The end surface 60f functions as a sliding portion sliding along the gear case body 18.

With the worm wheel 60 according to the present embodiment, part of the ribs 40a as shown in FIG. can be located in the first recessed flange portion 60c. As a result, the ribs 40a can enter into the first recessed flange portion 60c without causing interference with the flange 60a, so that the opposing portion 18a of the gear case body 18 can be brought closer to the worm wheel 60, thus making the whole casing thinner.

In other words, the worm wheel 60 according to the present embodiment allows entry of the ribs 40a as shown in FIG. 3, even when the ribs 40a are provided, in the first recessed flange portion 60c, within the casing that houses the worm wheel 60. Thus, the combination of the casing as described above and the worm wheel 60 can realize the thinning of the casing and further the thinning of the reducer.

Also, the first recessed flange portion 60c is provided, on an inner periphery 66 thereof, with a plurality of ribs 68 which serve as reinforcement portions to raise the rigidity of the teeth 60b. The ribs 68 are each triangular in shape. Also, the second recessed flange portion 60d is provided, on an inner periphery 67 thereof, with a plurality of ribs 69 which serve as reinforcement portions to raise the rigidity of the teeth 60b. The ribs 69 are each triangular in shape. Since the ribs are provided on both sides of the flange 60a and the periphery of the flange 60a is integrally connected to an approximately central part (a region F shown in FIG. 14) of the teeth 60b in an axial direction of the teeth 60b, the teeth 60b is less likely to sag or bend. As a result, the strength and rigidity of the teeth are raised, and there will be reduced deformation of the worm wheel as a whole. This in turn will improve the rotation accuracy of the reducer using a worm wheel such as above.

Also, as shown in FIG. 15A, the plurality of ribs 68 are arranged symmetrically about the center of the first recessed flange portion 60c. Also, as shown in FIG. 15B, the plurality of ribs 69 are arranged symmetrically about the center of the second recessed flange portion 60d. As a result, the forming accuracy of the teeth 60b is improved.

Also, the teeth 60b of the worm wheel 60 according to the present embodiment are so formed that a plurality of teeth are always in mesh with the worm. Similar to the worm wheel 50 of FIG. 13, the plurality of the ribs 68 (ribs 69) are arranged at such intervals that one or more of them are always on the inner periphery side of a plurality of teeth in mesh with the worm 28. This will prevent partial deformation of the worm wheel 60 on account of a large force that may work on the plurality of the teeth in mesh with the worm 28.

Note also that the worm wheel 60 is formed with loop-shaped positioning portions 60g, 60h, and 60j that can position a sealing member such as an O-ring. This prevents entry of water or dust into the apparatus from the sliding portions or joints with the other parts.

Also, the worm wheel 60 is structured such that a hole 60k into which the fixed shaft 24 is inserted is near the center of the bottom 64 but does not reach the end surface 60f. That is, the hole 60k is formed, but reaches only as far as the neighborhood of the bottom 64 of the first recessed flange portion 60c.

Also, as shown in FIG. 14 and FIG. 15A, formed at equal intervals around the hole 60k are circular recessed portions 60m which are deeper than the first recessed flange portion 60c. A rounded corner 60n is formed in a portion that connects the recessed portion 60m and the first recessed flange portion 60c. Thus, the worm wheel 60 has the first recessed flange portion 60c, the second recessed flange portion 60d, and the recessed portions 60m formed thereon, so that the volume thereof to be occupied by resin can be reduced. This contributes to lighter weight and reduced material cost.

(Fourth Embodiment)

Figure 16:
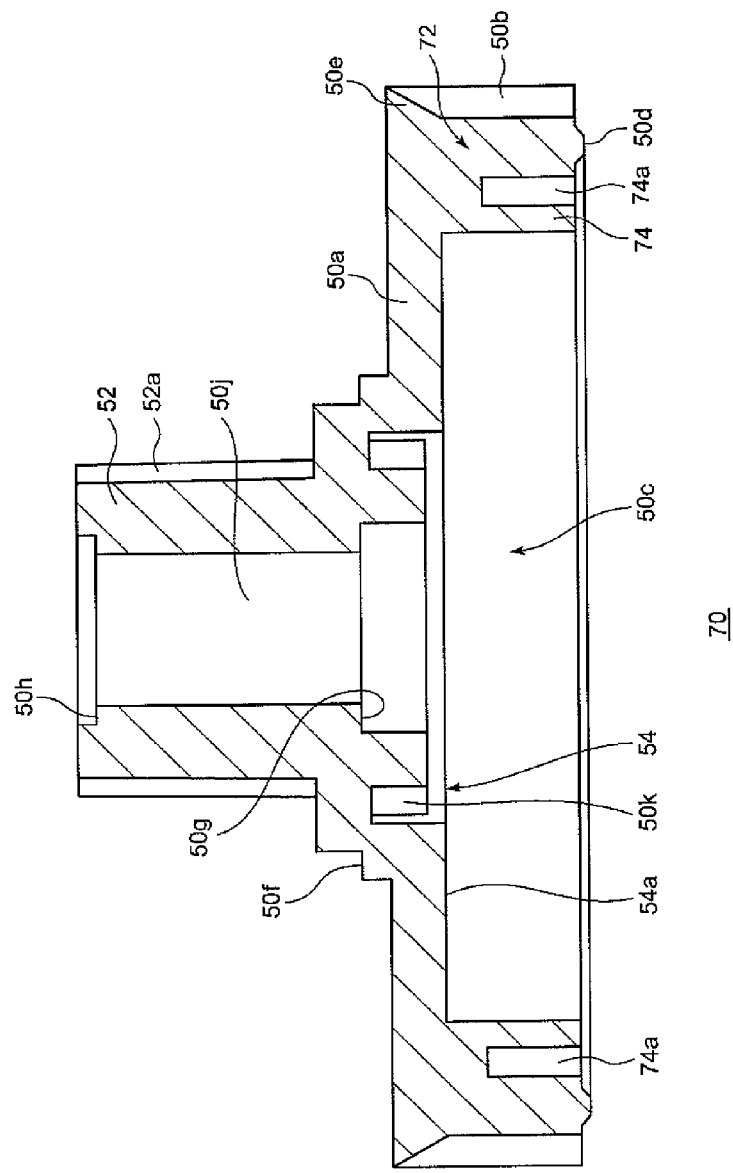
FIG. 16 is a cross-sectional view of a worm wheel according to a fourth embodiment.
Figure 17:
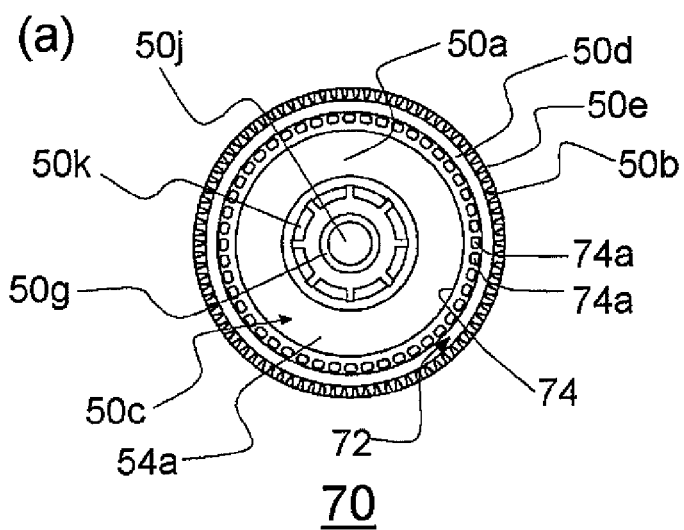
FIG. 17A is a bottom view of a worm wheel according to a fourth embodiment.
FIG. 17B is a top view of a worm wheel according to a fourth embodiment.
Figure 17:
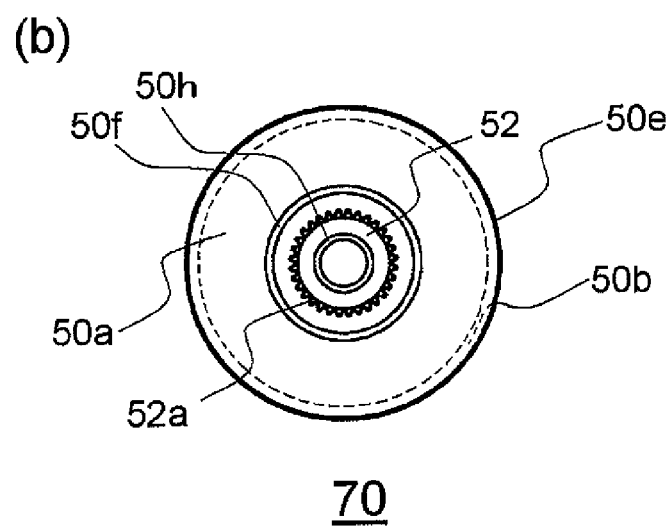

FIG. 16 is a cross-sectional view of a worm wheel according to a fourth embodiment. FIG. 17A is a bottom view of the worm wheel according to the fourth embodiment. FIG. 17B is a top view of the worm wheel according to the fourth embodiment. A worm wheel 70 according to the fourth embodiment is characterized by the feature that the shape of the reinforcement portions thereof differs from the worm wheel 50 according to the second embodiment. In the following description, the components identical to those of worm wheel 50 except for the reinforcement portions of the worm wheel 70 are given the identical reference numerals, and the repeated description thereof will be omitted as appropriate.

As shown in FIG. 16 and FIGS. 17A and 17B, the worm wheel 70 has a thick-walled portion 74 serving as a reinforcement portion that reinforces a rim 72 on the periphery of the flange 50a. The thick-walled portion 74 is a loop-shaped portion that constitutes an inner periphery side of the rim 72 and a periphery of the first recessed flange portion 50c, so that the strength and rigidity of the teeth 50b can be raised. Also, the thick-walled portion 74 has a plurality of thumb holes 74a formed symmetrically about the center of the first recessed flange portion 50c. As a result, the forming accuracy of the teeth 50b is improved. The thumb hole 74a is a hole of elliptical shape but may be of other shapes such as a circular hole and a rectangle hole, instead.

(Fifth Embodiment)

Figure 18:
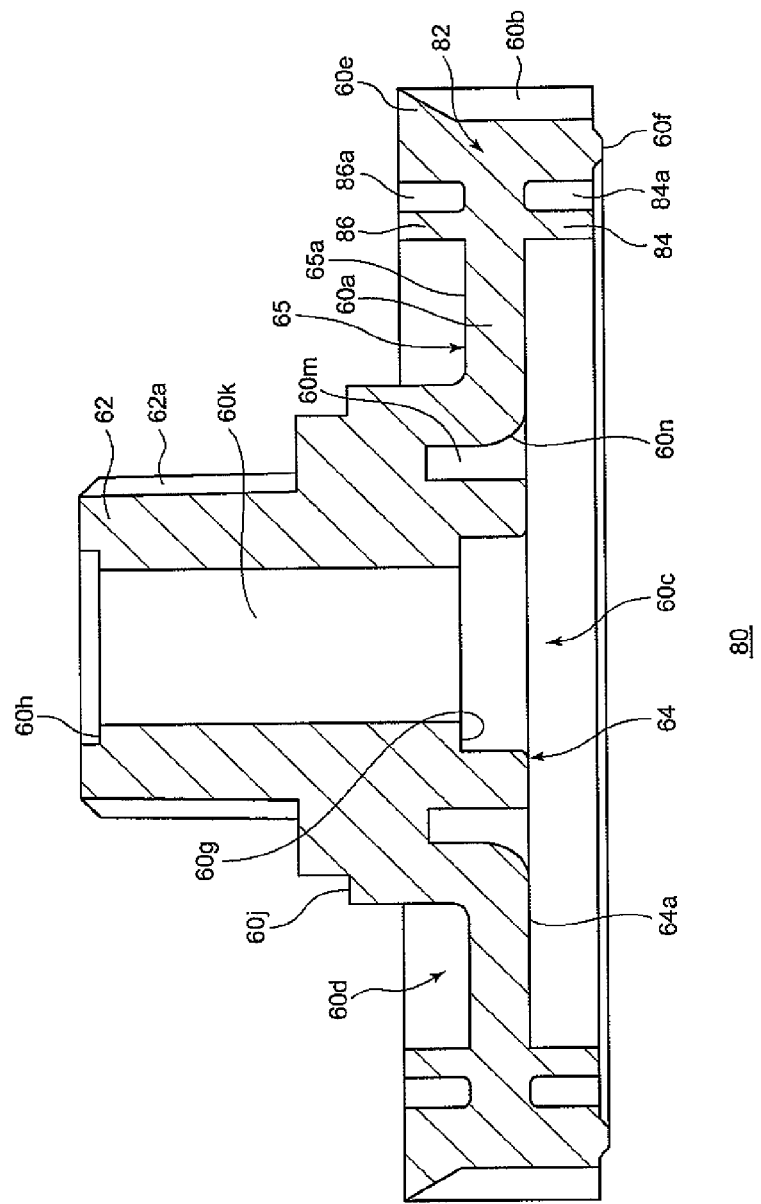
FIG. 18 is a cross-sectional view of a worm wheel according to a fifth embodiment.
Figure 19:
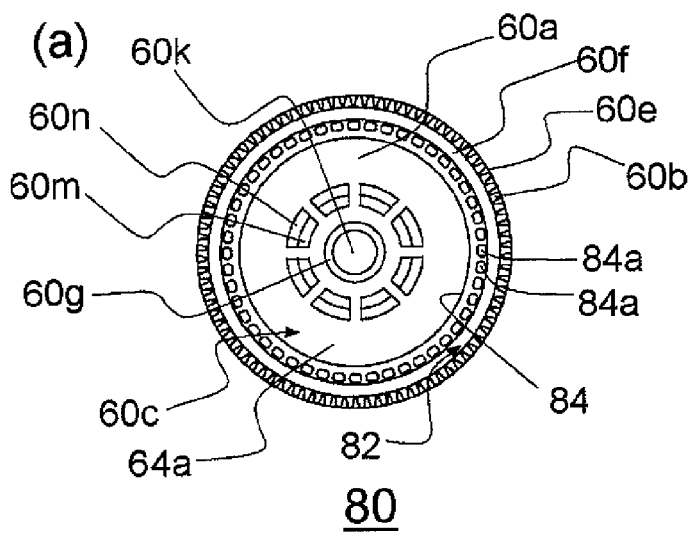
FIG. 19A is a bottom view of a worm wheel according to a fifth embodiment.
FIG. 19B is a top view of a worm wheel according to a fifth embodiment.
Figure 19:
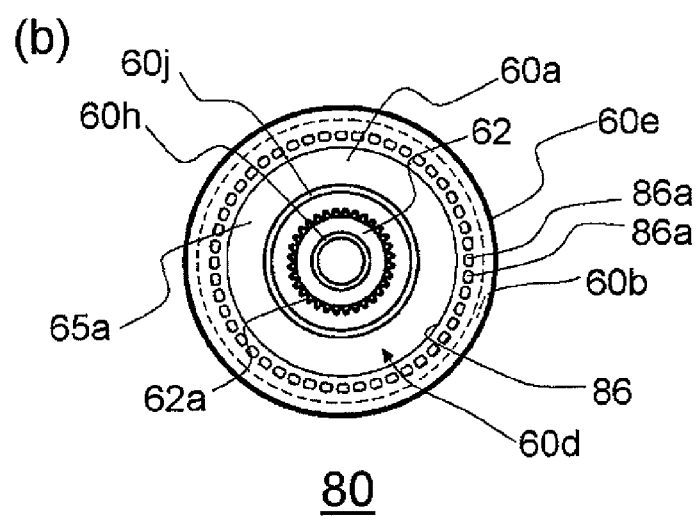

FIG. 18 is a cross-sectional view of a worm wheel according to a fifth embodiment. FIG. 19A is a bottom view of the worm wheel according to the fifth embodiment. FIG. 19B is a top view of the worm wheel according to the fifth embodiment. A worm wheel 80 according to the fifth embodiment is characterized by the feature that the shape of the reinforcement portions thereof differs from the worm wheel 60 according to the third embodiment. In the following description, the components identical to those of worm wheel 60 except for the reinforcement portions of the worm wheel 80 are given the identical reference numerals, and the repeated description thereof will be omitted as appropriate.

As shown in FIG. 18 and FIGS. 19A and 19B, the worm wheel 80 has thick-walled portions 84 and 86 serving as reinforcement portions that reinforce a rim 82 on the periphery of the flange 60a. The thick-walled portion 84 is a loop-shaped portion that constitutes an inner periphery side of the rim 82 and a periphery of the first recessed flange portion 60c. The thick-walled portion 86 is a loop-shaped portion that constitutes an inner periphery side of the rim 82 and a periphery of the second recessed flange portion 60d. The thick-walled portions 84 and 86 can raise the strength and rigidity of the teeth 50b. Also, the thick-walled portion 84 has thumb holes 84a formed symmetrically about the center of the first recessed flange portion 60c. The thick-walled portion 86 has thumb holes 86a formed symmetrically about the center of the second recessed flange portion 60d. As a result, the forming accuracy of the teeth 50b is improved. The thumb holes 84a and 86a are each a hole of elliptical shape but may be of other shapes such as a circular hole and a rectangle hole, instead.

The present invention is not limited to the above-described embodiments only. It is understood that various modifications such as changes in design may be made based on the knowledge of those skilled in the art, and the embodiments added with such modifications are also within the scope of the present invention.

In the above described embodiments, a description has been given of a structure where the recessed casing portion 38 of the gear case body 18 is provided with the ribs but the structure is not necessarily limited thereto. For example, a structure may be such that the casing has a flat opposing portion in opposition to a circular flange of the worm wheel and such that there is provided a rib protruding inward from the opposing portion.

Also, in the above described embodiments, a description has been given of a structure where the output shaft is rotatably supported by the fixed shaft but the structure may be such that the output shaft is rotatably supported by a bearing.

EXPLANATION OF REFERENCE NUMERALS

10 Motor unit
12 Reducer
14 Housing
14a Flat surface
14b Connecting surface
16 Casing
18 Gear case body
18a Opposing portion
18b Bottom
18c First sliding surface
18d Second sliding surface
18e Third sliding surface
20 Cover
22 Output shaft
22a Teeth
24 Fixed shaft
26 Shaft
28 Worm
30 Worm wheel
30a Flange
30a1 First sliding portion
30a2 Second sliding portion
30a3 Third sliding portion
30b Teeth
30c Recessed flange portion
30d End face
38 Recessed casing portion
40a, 40b Rib
100 DC motor with a reducer

INDUSTRIAL APPLICABILITY

The present invention relates to a reducer for a system member which is opened and closed by the use of motive power and, for example, a reducer used in opening and closing an power window or a sunroof of a motor vehicle. The present invention relates also to a worm wheel applicable to such a reducer.

The invention claimed is:

1. A reducer comprising:
a worm to which the revolution of a motor is communicated;
a worm wheel configured to engage with the worm and communicate the revolution to an output shaft; and
a casing configured to house the worm wheel,
wherein the casing has an opposing portion in opposition to a circular flange of the worm wheel,
wherein the opposing portion has a recessed casing portion recessed toward an interior of the casing,
wherein the recessed casing portion is provided with a plurality of radially-arranged ribs and a loop of a rib, and
wherein a bottom of the recessed casing is such that a surface on an output shaft side of the bottom constitutes a sliding surface over which the flange slides.

2. A reducer comprising:
a worm to which the revolution of a motor is communicated;
a worm wheel configured to engage with the worm and communicate the revolution to an output shaft; and
a casing configured to house the worm wheel,
wherein the casing has an opposing portion in opposition to a circular flange of the worm wheel,
wherein the opposing portion has a recessed casing portion recessed toward an interior of the casing,
wherein the recessed casing portion is provided with a plurality of radially-arranged ribs and a loop of a rib, and
wherein the opposing portion is such that a surface thereof opposite to the worm wheel constitutes a sliding surface over which worm wheel slides.

3. A reducer according to claim 1, wherein the worm wheel has teeth formed on a periphery thereof,
wherein a recessed flange portion which is recessed toward the output shaft from an end surface in opposition to the opposing portion of the teeth is provided in a middle part of the flange, and
wherein at least part of the ribs are located in the recessed flange portion.

4. A reducer according to claim 1, wherein the worm wheel is structured integrally with the output shaft.

5. A reducer according to claim 4, wherein the output shaft and the worm wheel are configured to rotate about a fixed shaft fixed to the casing.

6. A motor with a reducer, comprising:
a motor; and
a reducer, coupled to a shaft of the motor, according to claim 1,
wherein the motor includes a housing having two pairs opposing flat surfaces.

7. A motor with a reducer according to claim 6, wherein at least one of the two pairs of opposing flat surfaces is parallel to the opposing portion of the casing.

8. A reducer according to claim 2, wherein the worm wheel has teeth formed on a periphery thereof,
wherein a recessed flange portion which is recessed toward the output shaft from an end surface in opposition to the opposing portion of the teeth is provided in a middle part of the flange, and
wherein at least part of the ribs are located in the recessed flange portion.

9. A reducer according to claim 2, wherein the worm wheel is structured integrally with the output shaft.

10. A reducer according to claim 9, wherein the output shaft is rotatably supported by a fixed shaft fixed to the casing.

11. A motor with a reducer, comprising:
a motor; and
a reducer, coupled to a shaft of the motor, according to claim 2,
wherein the motor includes a housing having two pairs opposing flat surfaces.

12. A motor with a reducer according to claim 11, wherein at least one of the two pairs of opposing flat surfaces is parallel to the opposing portion of the casing.

* * * * *